(12) United States Patent
Chun

(10) Patent No.: US 10,397,855 B2
(45) Date of Patent: Aug. 27, 2019

(54) ACCESS ATTEMPT METHOD AND USER EQUIPMENT, AND ACCESS CONTROL METHOD AND BASE STATION

(71) Applicant: LG ELECTRONICS INC., Seoul (KR)

(72) Inventor: Sungduck Chun, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 15/868,524

(22) Filed: Jan. 11, 2018

(65) Prior Publication Data

US 2018/0199273 A1    Jul. 12, 2018

Related U.S. Application Data

(60) Provisional application No. 62/445,260, filed on Jan. 12, 2017.

(51) Int. Cl.
| | |
|---|---|
| H04W 48/14 | (2009.01) |
| H04W 76/27 | (2018.01) |
| H04W 74/08 | (2009.01) |
| H04W 88/08 | (2009.01) |
| H04W 88/02 | (2009.01) |

(52) U.S. Cl.
CPC ....... H04W 48/14 (2013.01); H04W 74/0833 (2013.01); H04W 76/27 (2018.02); H04W 88/02 (2013.01); H04W 88/08 (2013.01)

(58) Field of Classification Search
CPC .. H04W 48/14; H04W 76/27; H04W 74/0833
See application file for complete search history.

(56) References Cited

U.S. PATENT DOCUMENTS

| | | | | |
|---|---|---|---|---|
| 2006/0135177 | A1* | 6/2006 | Winterbottom | H04Q 7/20 |
| 2013/0078999 | A1* | 3/2013 | Martin | H04W 72/12 |
| 2015/0237566 | A1* | 8/2015 | Lee | H04W 48/06 |
| 2016/0212653 | A1* | 7/2016 | Wang | H04W 28/02 |

* cited by examiner

*Primary Examiner* — Ronald B Abelson
(74) *Attorney, Agent, or Firm* — Dentons US LLP

(57) ABSTRACT

A user equipment (UE) receives mapping information on each of a plurality of access categories. The UE determines whether access for a corresponding access category is permitted by applying access control information of an access category in the order of an access category with a higher priority to an access category with a lower priority based on the priority information, among access categories into which access attempt is mapped in accordance with the mapping information, if the access attempt is triggered.

10 Claims, 9 Drawing Sheets

(a) UE-P-GW user plane with E-UTRAN (b) Control Plane UE-MME

ACCESS ATTEMPT METHOD AND USER EQUIPMENT, AND ACCESS CONTROL METHOD AND BASE STATION

CROSS-REFERENCE TO RELATED APPLICATIONS

This application claims the benefit of U.S. Provisional Application Ser. No. 62/445,260, filed on Jan. 12, 2017, the contents of which are all hereby incorporated by reference herein in their entirety.

BACKGROUND OF THE INVENTION

Field of the Invention

The present invention relates to a wireless communication system, and more particularly, to a method and apparatus for attempting access to a network, and a method and apparatus for controlling the access.

Discussion of the Related Art

Wireless communication systems are widely deployed to provide various kinds of communication content such as voice and data services. Generally, these communication systems are multiple access systems capable of supporting communication with multiple users by sharing available system resources (e.g., bandwidth and transmission power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

SUMMARY OF THE INVENTION

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, a method for transmitting/receiving signals effectively in a system supporting new radio access technology is required.

Also, in accordance with the introduction of a new network function, a method for efficiently controlling access of UEs to a network is required.

Also, a method for providing fair access opportunities to UEs through minimum system load while providing different access opportunities to the UEs in accordance with types and services of the UEs is required.

The technical objects that can be achieved through the present invention are not limited to what has been particularly described hereinabove and other technical objects not described herein will be more clearly understood by persons skilled in the art from the following detailed description.

In an aspect of the present invention, provided herein is a method of attempting, by a user equipment (UE), an access to a network in a wireless communication system. The method comprises: receiving mapping information on each of a plurality of access categories and priority information indicating a priority per access category; determining whether access for a corresponding access category is permitted by applying access control information of an access category in the order of an access category with a higher priority to an access category with a lower priority based on the priority information, among access categories into which access attempt is mapped in accordance with the mapping information, if the access attempt is triggered; and performing the access attempt if, among the access categories into which the access attempt is mapped, there is an access category for which access is permitted.

In another aspect of the present invention, provided herein is a user equipment (UE) for attempting an access to a network in a wireless communication system. The UE comprises a radio frequency (RF) unit; and a processor configured to control the RF unit. The processor may be configured to: control the RF unit to receive mapping information on each of a plurality of access categories and priority information indicating a priority per access category; determine whether access for a corresponding access category is permitted by applying access control information of an access category in the order of an access category with an higher priority to an access category with a lower priority based on the priority information, among access categories into which an access attempt is mapped in accordance with the mapping information, if the access attempt is triggered; and control the RF unit to perform the access attempt if, among the access categories into which the access attempt is mapped, there is an access category for which access is mapped.

In a further aspect of the present invention, provided herein is a method of controlling, by a base station (BS), an access of a user equipment (UE) to a network in a wireless communication system. The method comprises: transmitting mapping information on each of a plurality of access categories and priority information indicating a priority per access category; and receiving an access request to the network from the UE.

In a still further aspect of the present invention, provided herein is a base station (BS) for controlling an access of a UE to a network in a wireless communication system. The BS comprises a radio frequency (RF) unit; and a processor configured to control the RF unit. The processor may be configured to: control the RF unit to transmit mapping information on each of a plurality of access categories and priority information indicating a priority per access category; and control the RF unit to receive an access request to the network from the UE.

In each aspect of the present invention, the access attempt may be not performed if, among the access categories into which the access attempt is mapped, there is no access category for which access is permitted.

In each aspect of the present invention, the UE may receive access control information on one or more of the plurality of access categories. The BS may transmit access control information on one or more of the plurality of access categories.

In each aspect of the present invention, for each of the plurality of access categories, the mapping information may indicate a network slice, IP address, signal format or access cause In each aspect of the present invention, performing the access attempt may include starting a random access procedure or radio resource control (RRC) connection establishment procedure.

The above technical solutions are merely some parts of the embodiments of the present invention and various embodiments into which the technical features of the present invention are incorporated can be derived and understood by persons skilled in the art from the following detailed description of the present invention.

According to the present invention, network access of UEs may be controlled efficiently.

According to the present invention, different access opportunities different from one another may be provided to UEs in accordance with types and services of the UEs. Also, according to the present invention, fair access opportunities may be provided to UEs through minimum system load.

According to the present invention, radio communication signals can be efficiently transmitted/received. Therefore, overall throughput of a radio communication system can be improved.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

DETAILED DESCRIPTION OF THE PREFERRED EMBODIMENTS

Figure 1:
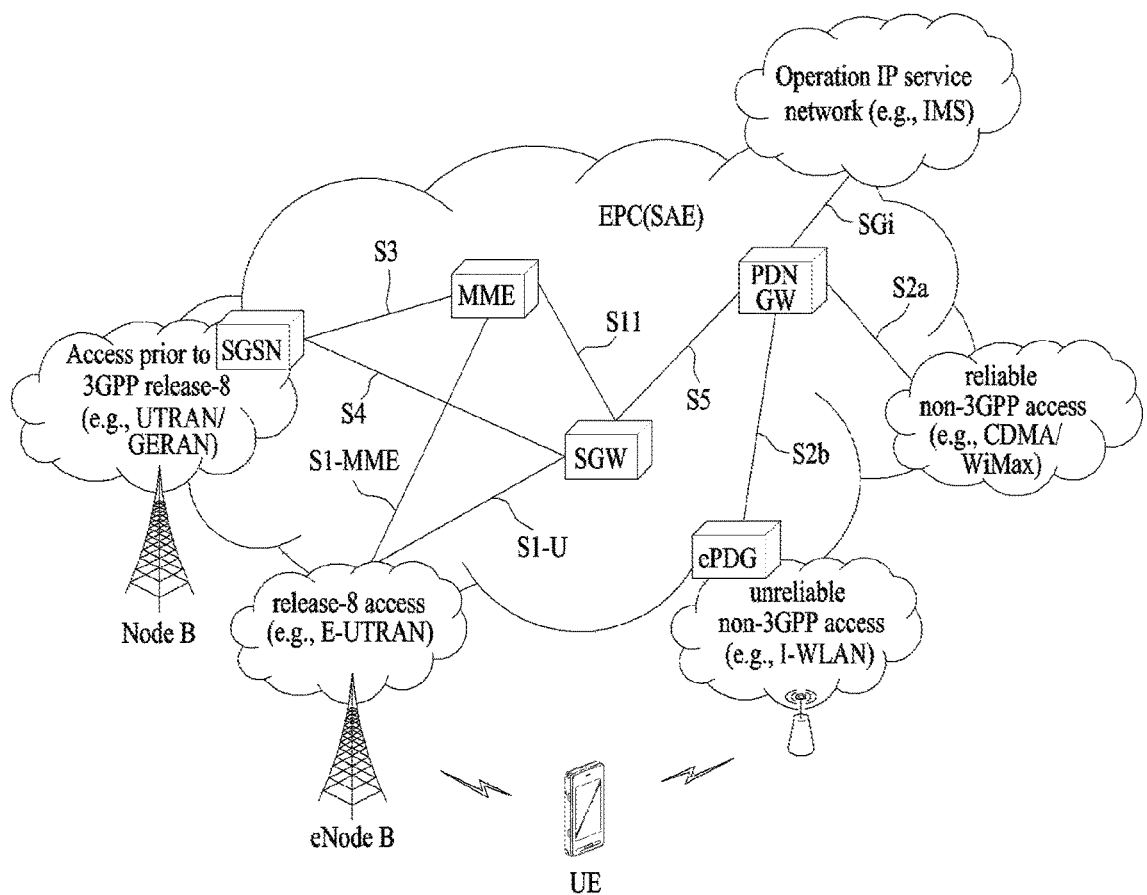
FIG. 1 is a schematic diagram showing the structure of an evolved packet system (EPS) including an evolved packet core (EPC).

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the terms used in the present invention are selected from generally known and used terms while considering functions of the present invention, they may vary according to intention or customs of those skilled in the art or emergence of new technology. Some of the terms mentioned in the description of the present invention may have been selected by the applicant at his or her discretion, and in such cases the detailed meanings thereof will be described in relevant parts of the description herein. Thus, the terms used in this specification should be interpreted based on the substantial meanings of the terms and the whole content of this specification rather than their simple names or meanings.

The embodiments of the present invention described hereinbelow are combinations of elements and features of the present invention. The elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a" (or "an"), "one", "the", etc. may include a singular representation and a plural representation in the context of the present invention (more particularly, in the context of the following claims) unless indicated otherwise in the specification or unless context clearly indicates otherwise.

The embodiments of the present invention can be supported by standard specifications disclosed for at least one of wireless access systems including an institute of electrical and electronics engineers (IEEE) 802.xx, a 3rd generation partnership project (3GPP) system, a 3GPP Long Term Evolution (3GPP LTE) system, and a 3GPP2 system. That is, steps or parts that are not described to clarify the technical features of the present invention may be explained with reference to the above standard specifications.

In addition, all terms set forth herein may be explained by the above standard specifications. For example, the present disclosure may be incorporated by reference by one or more of standard specifications, such as 3GPP TS 36.300, 3GPP TS 36.321, 3GPP TS 36.322, 3GPP TS 36.323, 3GPP TS 36.331, 3GPP TS 23.303, 3GPP TS 23.401, 3GPP TS 24.301, 3GPP TR 22.885, 3GPP TR 23.785, 3GPP TS 23.285, 3GPP TS 23.246, 3GPP TS 23.468, ETSI TS 302 637-2, ETSI TS 302 637-3, ETS TR 102 638, and IEEE 1609.12.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

Specific terms used for the embodiments of the present invention are provided to aid in understanding of the present invention. These specific terms may be replaced with other terms within the scope and spirit of the present invention.

The terms used in this specification are defined as follows.

IMS (IP Multimedia Subsystem or IP Multimedia Core Network Subsystem): An architectural framework for providing standardization for delivery of voice or other multimedia services over Internet protocol (IP).

UMTS (Universal Mobile Telecommunications System): Global System for Mobile Communication (GSM)-based 3rd generation mobile communication technology developed by 3GPP.

EPS (Evolved Packet System): A network system configured by an EPC (Evolved Packet Core), which is an Internet Protocol (IP)-based packet switched (PS) core network and an access network such as LTE, UTRAN, etc. The EPS is evolved from UMT.

NodeB: A base station of GERAN/UTRAN which is installed outdoors and has coverage of a macro cell scale.

eNodeB/eNB: A base station of E-UTRAN which is installed outdoors and has coverage of a macro cell scale.

UE (User Equipment): A user equipment. The UE may be referred to as a terminal, ME (Mobile Equipment), MS (Mobile Station), or the like. The UE may be a portable device such as a notebook computer, cellular phone, PDA (Personal Digital Assistant), smartphone, and multimedia device, or may be a nonportable device such as a PC (Personal Computer) and vehicle-mounted device. The term UE or terminal in the description of MTC may refer to an MTC device.

HNB (Home NodeB): A base station of a UMTS network. The HNB is installed indoors and has coverage of a micro cell scale.

HeNB (Home eNodeB): A base station of an EPS network. The HeNB is installed indoors and has coverage of a micro cell scale.

MME (Mobility Management Entity): A network node of the EPS network performing functions of Mobility Management (MM) and Session Management (SM).

PDN-GW (Packet Data Network-Gateway)/PGW/P-GW: A network node of the EPS network performing functions of UE IP address allocation, packet screening and filtering, and charging data collection.

SGW (Serving Gateway)/S-GW: A network node of the EPS network performing functions of mobility anchor, packet routing, idle mode packet buffering, and triggering of the MME paging the UE.

PCRF (Policy and Charging Rule Function): A network node of the EPS network making a policy decision for dynamically applying a differentiated QoS and charging policy on a service flow basis.

OMA DM (Open Mobile Alliance Device Management): A protocol designed for management of mobile devices such as a cellular phone, a PDA, and a portable computer, that performs functions of device configuration, firmware upgrade, and error report.

OAM (Operation Administration and Maintenance): A group of network management functions that provides network defect indication, performance information, and data and diagnosis functions.

NAS (Non-Access Stratum): An upper stratum of a control plane between the UE and the MME. The NAS is a functional layer for signaling between a UE and a core network and exchange of a traffic message between the UE and the core network in LTE/UMTS protocol stack. The NAS mainly functions to support UE mobility and a session management procedure for establishing and maintaining IP connection between a UE and a PDN GW.

EMM (EPS Mobility Management): A sub-layer of a NAS layer, that may be in either an "EMM-Registered" or "EMM-Deregistered" state depending on whether a UE is attached to or detached from a network.

ECM (EMM Connection Management) connection: A signaling connection for exchange of a NAS message, established between the UE and an MME. The ECM connection is a logical connection consisting of an RRC connection between the UE and an eNB and an S1 signaling connection between the eNB and the MME. If the ECM connection is established/terminated, the RRC connection and the S1 signaling connection are all established/terminated as well. To the UE, an established ECM connection means having an RRC connection established with the eNB and, to the MME, the established ECM connection means having an SI signaling connection established with the eNB. Depending on whether a NAS signaling connection, i.e., the ECM connection, is established, ECM may be in either "ECM-Connected" or "ECM-Idle" state.

AS (Access-Stratum): This includes a protocol stack between the UE and a wireless (or access) network and is in charge of data and network control signal transmission.

NAS configuration MO (Management Object): An MO used in the process of configuring parameters related to NAS functionality for the UE.

PDN (Packet Data Network): A network where a server (e.g., an MMS (Multimedia Messaging Service) server, a WAP (Wireless Application Protocol) server, etc.) supporting a specific service is located.

PDN connection: A logical connection between a PDN and a UE represented by one IP address (one IPv4 address and/or one IPv6 prefix).

APN (Access Point Name): A text sequence for indicating or identifying a PDN. A requested service or network is accessed through a specific P-GW. The APN means a predefined name (text sequence) in a network so as to discover this P-GW. (e.g., internet.mnc012.mcc345.gprs).

RAN (Radio Access Network): A unit including a NodeB, an eNodeB and an RNC (Radio Network Controller) for controlling the NodeB and the eNodeB in a 3GPP network. The RAN is present between UEs and provides connection to the core network.

HLR (Home Location Register)/HSS(Home Subscriber Server): A database containing subscriber information of a 3GPP network. The HSS can perform functions such as configuration storage, identity management and user state storage.

PLMN (Public Land Mobile Network): A network configured for the purpose of providing mobile communication services to individuals. This network can be configured per operator.

ANDSF (Access Network Discovery and Selection Function): One network entity that provides a policy to discover and select access that the UE can use with respect to each service provider.

EPC path (or infrastructure data path): A user plane communication path through an EPC.

E-RAB (E-UTRAN Radio Access Bearer): Concatenation of an S1 bearer and a data radio bearer corresponding to the S1 bearer. If the E-RAB is present, there is one-to-one mapping between the E-RAB and an EPS bearer of a NAS.

GTP (GPRS Tunneling Protocol): A group of IP-based communication protocols used to carry a general packet radio service (GPRS) within GSM, UMTS, and LTE networks. In 3GPP architectures, GTP and proxy mobile IPv6 based interfaces are specified on various interface points. The GTP can be decomposed into some protocols (e.g., GTP-C, GTP-U, and GTP'). GTP-C is used within a GPRS core network for signaling between gateway GPRS support nodes (GGSN) and serving GPRS support nodes (SGSN). GTP-C allows the SGSN to activate a session on a user's behalf (e.g., PDN context activation), deactivate the same session, adjust quality of service parameters, or update a session for a subscriber that has just arrived from another SGSN. GTP-U is used to carry user data within the GPRS core network and between a radio access network and a core network.

Proximity service (or ProSe service or proximity based service): A service for enabling discovery and mutual direct communication, communication via an eNB, or communication via a third device, between physically adjacent devices. In this case, user plane data is exchanged through a direct data path without passing through a 3GPP core network (e.g., EPC).

ProSe communication: Communication through a ProSe communication path between two or more ProSe-enabled UEs. Unless mentioned otherwise, ProSe communication means one of ProSe E-UTRA communication, ProSe-assisted WLAN direct communication between two UEs, ProSe group communication, and ProSe broadcast communication.

ProSe E-UTRA communication: ProSe communication using a ProSe E-UTRA communication path.

ProSe-assisted WLAN direct communication: ProSe communication using a direct communication path.

ProSe communication path: A communication path supporting ProSe communication. A ProSe E-UTRA communication path may be established between ProSe-enabled UEs or through a local eNB, using E-UTRA. A ProSe-assisted WLAN direct communication path may be directly established between ProSe-enabled UEs, using a WLAN.

EPC path (or infrastructure data path): A user plane communication path through an EPC.

ProSe discovery: A process of identifying/confirming adjacent ProSe-enabled UEs, using E-UTRA.

ProSe group communication: One-to-multi ProSe communication using a common communication path, between two or more adjacent ProSe-enabled UEs.

ProSe UE-to-network relay: A ProSe-enabled public safety UE operating as a communication relay between a ProSe-enabled network and a ProSe-enabled UE, using E-UTRA.

Remote UE: A ProSe-enabled UE connected to an EPC network through the ProSe UE-to-network relay, i.e., communicating through a PDN, without being serviced by an E-UTRAN.

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, In 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
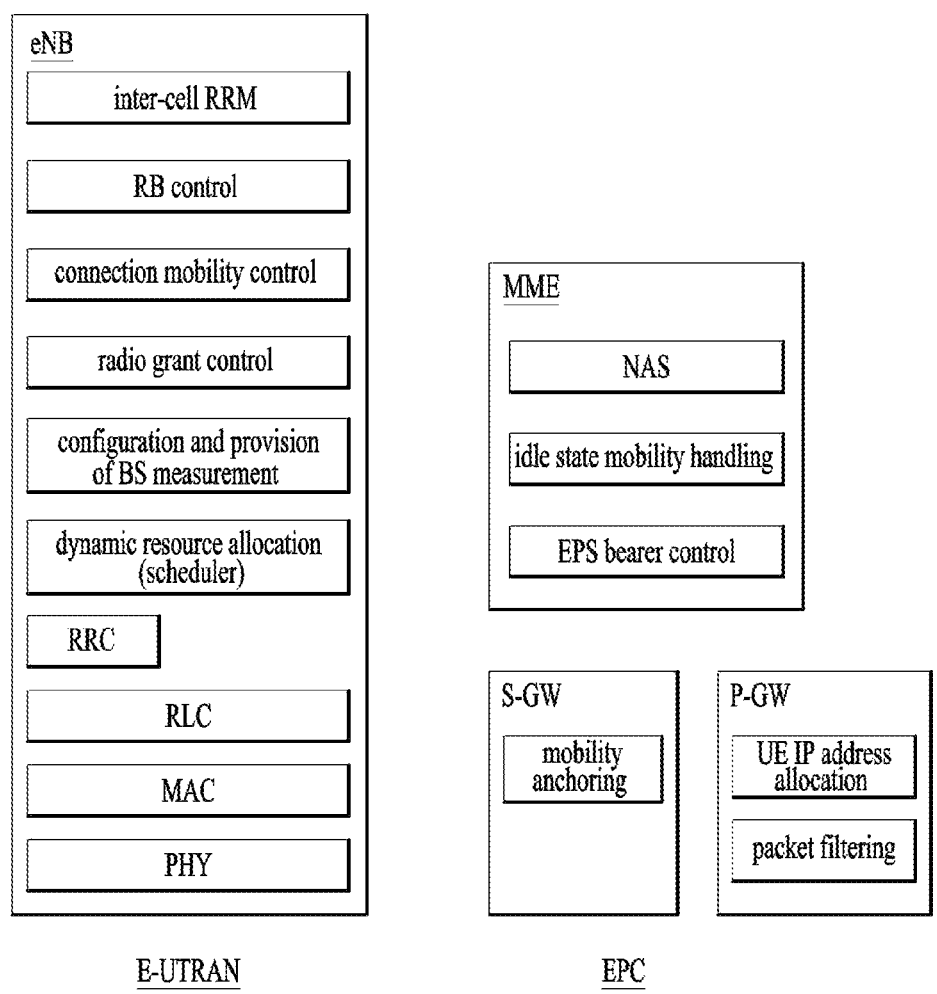
FIG. 2 is a diagram exemplarily illustrating architectures of a general E-UTRAN and EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
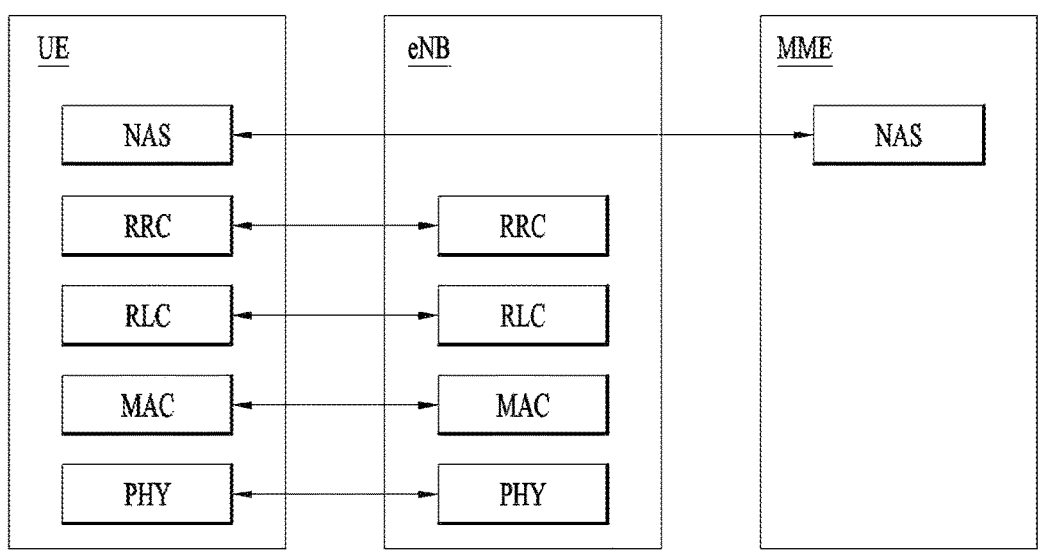
FIG. 3 is a diagram exemplarily illustrating the structure of a radio interface protocol in a control plane.
Figure 4:
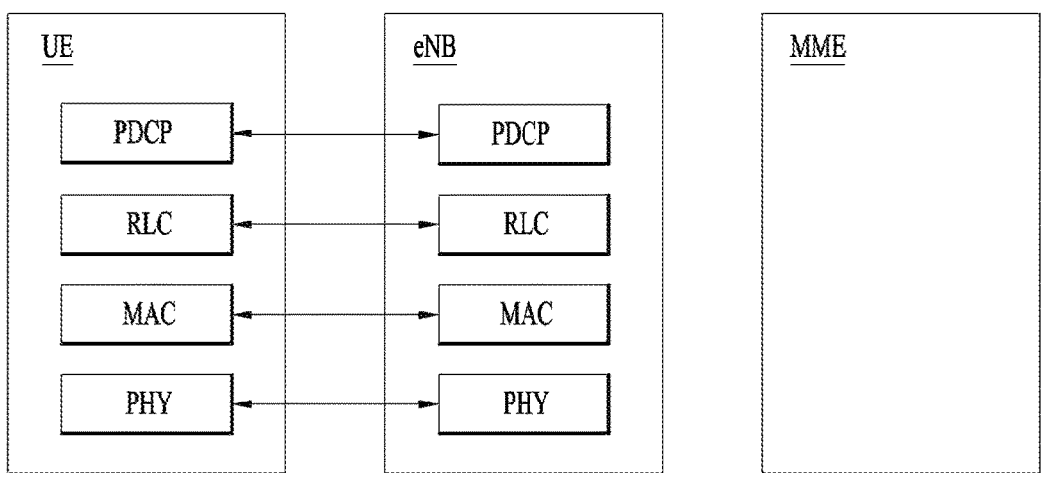
FIG. 4 is a diagram exemplarily illustrating the structure of an radio interface protocol in a user plane.

FIG. 3 is a diagram exemplarily illustrating the structure of a radio interface protocol in a control plane between a UE and an eNB, and FIG. 4 is a diagram exemplarily illustrating the structure of a radio interface protocol in a user plane between the UE and the eNB.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access

TABLE 1

| Reference Point | Description |
|---|---|
| S1-MME | Reference point for the control plane protocol between E-UTRAN and MME. |
| S1-U | Reference point between E-UTRAN and Serving GW for the per bearer user plane tunneling and inter eNB path switching during handover. |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and Serving GW. |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses.) | control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers. First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The ESM (Evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

The UE requested PDN connectivity procedure is for a UE to request the setup of a default EPS bearer to a PDN.

The UE requests connectivity to a PDN by sending a PDN connectivity request message to the network. If accepted by the network, this procedure initiates the establishment of a default EPS bearer context. If EMM-REGISTERED without PDN connection is not supported by the UE or the MME, for the UE having no PDN connection, the procedure is used either to establish the first default bearer by including the PDN connectivity request message into the initial attach message. Otherwise, the procedure is used to establish subsequent default bearers to additional PDNs in order to allow the UE simultaneous access to multiple PDNs by sending the message stand-alone. If EMM-REGISTERED without PDN connection is supported by the UE and the MME, the procedure is used to establish the first or subsequent default bearers to a PDN or additional PDNs by sending the PDN connectivity request message stand-alone.

When the PDN connectivity request message is sent together with an attach request message, the UE may not include the APN. In order to request connectivity to a PDN using the default APN, the UE includes the access point name IE in the PDN connectivity request message or, when applicable, in the ESM information response message, according to specific conditions. In order to request connectivity to an additional PDN using a specific APN, the UE includes the requested APN in the PDN request message.

Figure 5:
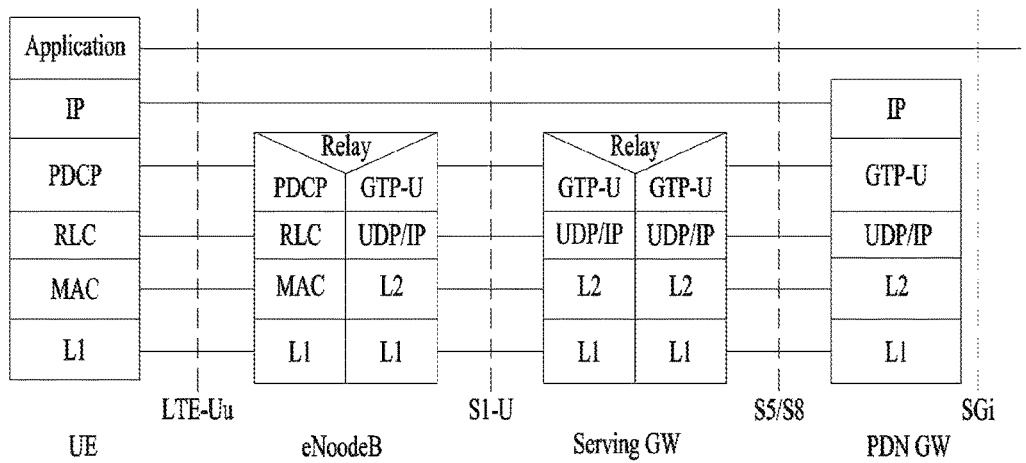
FIG. 5 is a diagram illustrating LTE (Long Term Evolution) protocol stacks for a user plane and a control plane.
Figure 5:
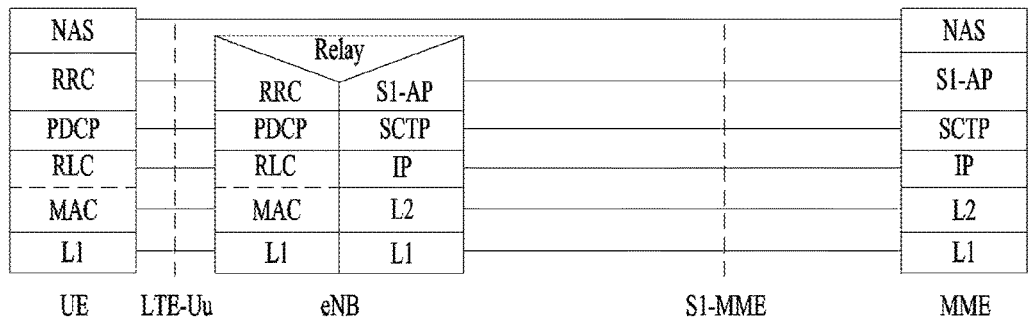

FIG. 5 illustrates LTE protocol stacks for a user plane and a control plane. FIG. 5(a) illustrates user plane protocol stacks over UE-eNB-SGW-PGW-PDN and FIG. 5(b) illustrates control plane protocol stacks over UE-eNB-MME-SGW-PGW. Functions of key layers of the protocol stacks will now be briefly described below.

Referring to FIG. 5(a), a GTP-U protocol is used to forward user IP packets over an S1-U/S5/X2 interface. If a GTP tunnel is established to forward data during LTE handover, an end marker packet is transferred to the GTP tunnel as the last packet.

Referring to FIG. 5(b), an S1-AP protocol is applied to an S1-MME interface. The S1-AP protocol supports functions such as S1 interface management, E-RAB management, NAS signaling delivery, and UE context management. The S1-AP protocol transfers an initial UE context to the eNB in order to set up E-RAB(s) and then manages modification or release of the UE context. A GTP-C protocol is applied to S11/S5 interfaces. The GTP-C protocol supports exchange of control information for generation, modification, and termination of GTP tunnel(s). The GTP-C protocol generates data forwarding tunnels in the case of LTE handover.

A description of the protocol stacks and interfaces illustrated in FIGS. 3 and 4 is applicable to the same protocol stacks and interfaces illustrated in FIG. 5.

Figure 6:
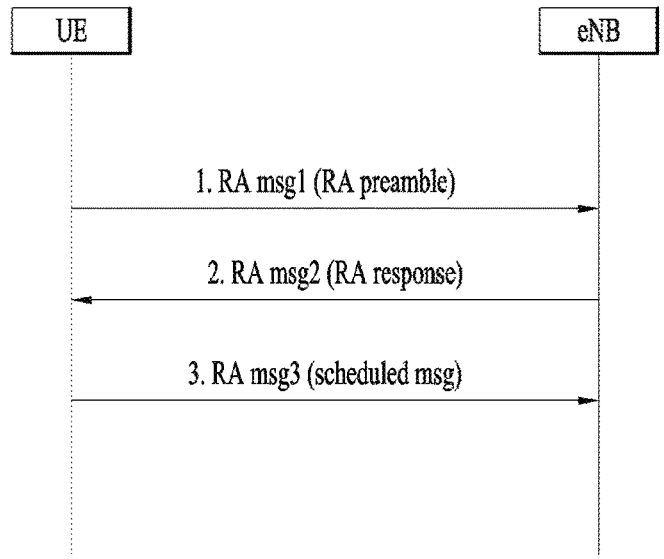
FIG. 6 is a flow diagram illustrating a random access procedure.

FIG. 6 is a flowchart illustrating a random access procedure in 3GPP LTE.

The random access procedure is used for a UE to obtain UL synchronization with a base station or to be assigned a UL radio resource.

The UE receives a root index and a physical random access channel (PRACH) configuration index from an eNB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The random access procedure, in particular, a contention-based random access procedure, includes the following three steps. Messages transmitted in the following steps 1, 2, and 3 are referred to as msg1, msg2, and msg4, respectively.

1. The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

2. Upon receiving the random access preamble, the eNB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH. The RAR includes timing advance (TA) information indicating timing offset information for UL synchronization, UL resource allocation information (UL grant information), and a temporary UE identifier (e.g., a temporary cell-RNTI (TC-RNTI)).

3. The UE may perform UL transmission according to resource allocation information (i.e., scheduling information) and a TA value in the RAR. HARQ is applied to UL transmission corresponding to the RAR. Accordingly, after performing UL transmission, the UE may receive reception response information (e.g., a PHICH) corresponding to UL transmission.

Figure 7:
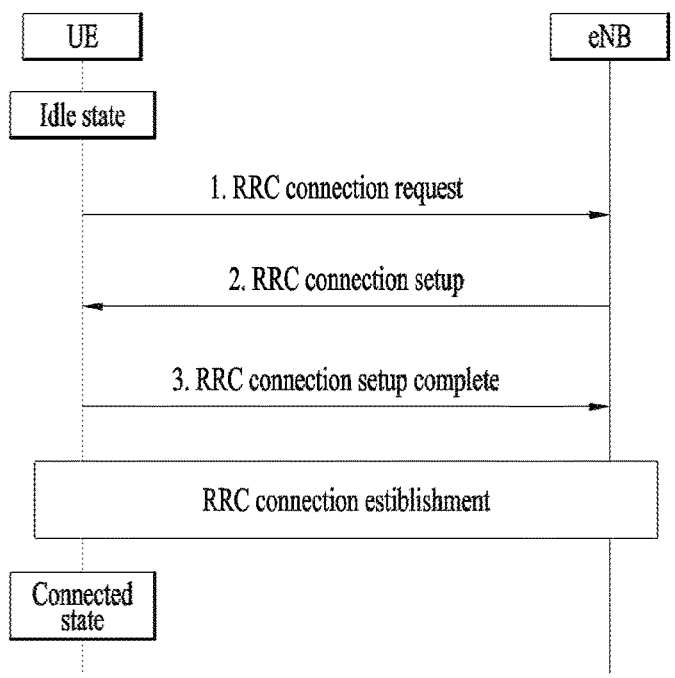
FIG. 7 is a diagram illustrating a connection procedure in a radio resource control (RRC) layer.

FIG. 7 illustrates a connection procedure in a radio resource control (RRC) layer.

As shown in FIG. 7, the RRC state is set according to whether or not RRC connection is established. An RRC state indicates whether or not an entity of the RRC layer of a UE has logical connection with an entity of the RRC layer of an eNB. An RRC state in which the entity of the RRC layer of the UE is logically connected with the entity of the RRC layer of the eNB is called an RRC connected state. An RRC state in which the entity of the RRC layer of the UE is not logically connected with the entity of the RRC layer of the eNB is called an RRC idle stat.

A UE in the Connected state has RRC connection, and thus the E-UTRAN may recognize presence of the UE in a cell unit. Accordingly, the UE may be efficiently controlled. On the other hand, the eNB cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, does the UE establish RRC connection with the RRC layer of the eNB through the RRC connection procedure and then transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNB, transmission of an RRC connection setup message from the eNB to the UE, and transmission of an RRC connection setup complete message from the UE to eNB, which are described in detail below with reference to FIG. 7.

1. When the UE in the idle state desires to establish RRC connection for reasons such as an attempt to make a call, a data transmission attempt, or a response of the eNB to paging, the UE transmits an RRC connection request message to the eNB first.
2. Upon receiving the RRC connection request message from the UE, the eNB accepts the RRC connection request of the UE when the radio resources are sufficient, and then transmits an RRC connection setup message, which is a response message, to the UE.
3. Upon receiving the RRC connection setup message, the UE transmits an RRC connection setup complete message to the eNB.

Only when the UE successfully transmits the RRC connection setup complete message, does the UE establish RRC connection with the eNB and transition to the RRC connected mode.

In order for the UE of an idle state to transition to an activation state in which traffic transmission/reception can be performed due to occurrence of new traffic, a service request procedure is performed. If traffic to be transmitted by the UE occurs or traffic to be transmitted to the UE by a network occurs in a state in which the UE is registered with the network but an S1 connection is released and a wireless resource is not allocated to the UE due to traffic inactivation, i.e., in a state in which the UE is in an EMM registered state (EMM-Registered) but is in an ECM-Idle state, the UE requests that the network provide a service. Upon successfully completing the service request process, the UE transitions to an ECM connected state (ECM-Connected) and configures an ECM connection (RRC connection+S1 signaling connection) in a control plane and an E-RAB (a data radio bearer (DRB) and an S1 bearer) in a user plane, thereby transmitting/receiving traffic. If the network desires to transfer traffic to the UE of an ECM idle state (ECM-Idle), the network informs the UE, through a paging message, that there is traffic to be transmitted so that the UE may request that the network provide a service.

Figure 8:
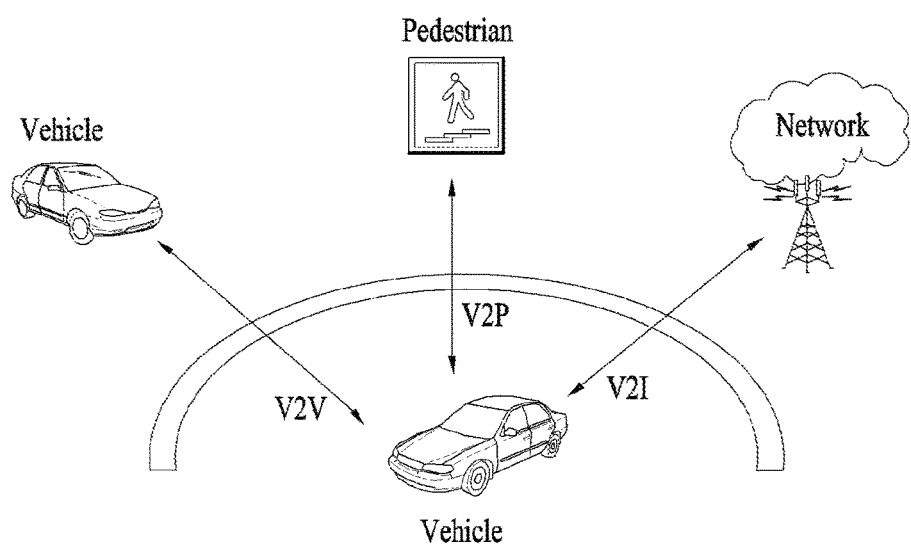
FIG. 8 is a diagram illustrating a vehicle-to-everything (V2X) communication environment.

FIG. 8 is a diagram illustrating a vehicle-to-everything (V2X) communication environment.

If a vehicle accident happens, significant injury and property damage may occur. Therefore, demand for technology capable of guaranteeing safety of pedestrians as well as safety of people riding in a vehicle is increasing. Thus, technology based on hardware and software specialized for a vehicle has been incorporated into the vehicle. LTE based V2X communication technology evolved from 3GPP shows a trend of incorporating information technology (IT) into the vehicle. A connectivity function is applied to some vehicle models and a study supporting vehicle-to-vehicle (V2V) communication, vehicle-to-infrastructure (V2I) communication, vehicle-to-pedestrian (V2P) communication, and vehicle-to-network (V2N) communication has continued due to evolution of a communication function.

According to V2X communication, a vehicle continues to broadcast information about the location, velocity, and direction thereof. A contiguous vehicle that has received the broadcast information uses the information for the purpose of accident prevention by recognizing movement of vehicles therearound. That is, similar to the case in which a person possesses a UE such as a smartphone or a smartwatch, a vehicle also mounts a UE of a specific type therein. In this case, the UE mounted in the vehicle is a device to which an actual communication service is provided by a communication network. For example, the UE mounted in the vehicle may be connected to an eNB in an E-UTRAN and receive a communication service. However, there are many considerations to implement V2X communication in the vehicle because astronomical costs are consumed to install traffic safety infrastructure such as a V2X eNB. That is, in order to support V2X communication on all roads on which vehicles can move, hundreds of thousands of V2X eNBs should be installed. In addition, since each network node accesses the Internet or a central control server on a wired network basis for the purpose of stable communication with a server, a wired network should be installed and installation and maintenance costs of the wired network are high.

For design of the next generation mobile network system, for example, 5G core network, service requirements have been defined through study called SMARTER (Services and Markets Technology Enablers) in the 3GPP. Also, system architecture 2 is under work on architecture for next generation system on the basis of SMARTER. Hereinafter, requirements and architecture for a next generation communication system considered in the 3GPP will be described. The followings exemplarily illustrate some of considerations for support of an architecture of a next generation (hereinafter, NextGen) system. The NextGen system shall:

Support the new RAT(s), the Evolved E-UTRA, and non-3GPP access types. GERAN and UTRAN are not supported.

Support unified authentication framework for different access systems.

Support multiple simultaneous connections of an UE via multiple access technologies.

Support different means for reducing UE power consumption while UE is in periods with data traffic as well as in periods without data traffic.

Support services that have different latency requirements between the UE and the Data Network.

Minimize the signaling (and delay) required to start the traffic exchange between the UE and the Data Network, i.e. signaling overhead and latency at transition from a period where UE has no data traffic to a period with data traffic.

Support access to applications (including 3rd party applications) with low latency requirements hosted close to the access network within the operator trust domain.

Support optimized mechanisms to control (includes avoiding) signaling congestion.

Efficient network support for a large number of UEs in periods without data traffic.

Support network sharing.

Support network slicing.

Minimize energy consumption in the overall network operation.

Figure 9:
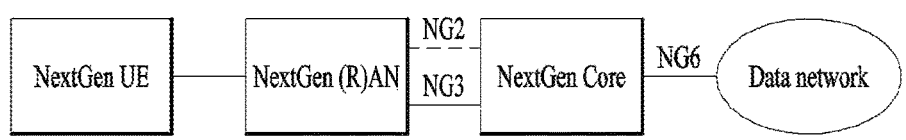
FIG. 9 is a diagram illustrating a high level architecture that may be used as a reference model for a next generation (NextGen) system.

FIG. 9 illustrates the high level architecture that can be used as a reference model for the next generation (NextGen) system. Especially, FIG. 9 illustrates the NextGen UE, NextGen (R)AN, NextGen Core and their reference points.

In FIG. 9, NG2 is a reference point for the control plane between NextGen (R)AN and NextGen Core, NG3 is a reference point for the user plane between NextGen (R)AN and NextGen Core, NG1 is a reference point for the control plane between NextGen UE and NextGen Core, and NG6 is a reference point between between the NextGen Core and the data network. Data network may be an operator external public or private data network or an intra-operator data network, e.g. for provision of IMS services. NG6 corresponds to SGi for 3GPP accesses.

Hereinafter, network slicing considered in the NextGen system will be described. Network slicing enables the operator to create networks customised to provide optimized solutions for different market scenarios which demands diverse requirements, e.g. in the areas of functionality, performance and isolation. One key concept to achieve the goal of flexibility is network slicing. Network slicing allows the operator to provide dedicated logical networks with customer specific functionality, without losing the economies of scale of a common infrastructure. It allows services to be abstracted from the network resources. As such, a variety of use cases with diverging requirements can be fulfilled. For example, there will be different requirements on functionality such as charging, policy control, security, mobility etc. The use cases will also have differences in performance requirements e.g., lower latency, higher mobility and higher data rate. There is also a need to isolate the different slices from each other. Terminals can be directed to appropriate network slices at the same time in ways that fulfil operator or user needs, e.g., based on subscription, traffic (e.g., voice, data), or terminal type. Typically a set of end-user services are provided by one network slice of a mobile network operator. Some UEs can access more than one network slice simultaneously for services of more diverse characteristics, e.g., MBB and critical communication. When accessing more than one network slice simultaneously, the operator may choose to not duplicate certain signaling procedures. Network slices will consist of mainly 3GPP defined functions but could also include proprietary functions that are provided by different operators or 3rd parties. To guarantee a consistent user experience and support of services in case of roaming, slices composed of the same network functions should be available for the user in the VPLMN. Configuration of network slices and provisioning of proprietary functions will be based on agreements between operators. Network slicing could also be used to provide a network configuration enabling basic communications (e.g., voice, text messages) in case of natural disasters. Another example of applying this concept could be to provide access to the network in markets where there is a need for providing access to essential services with a basic Internet access (e.g., basic broadband speeds, relaxed latency requirements). An operator often provides similar service to multiple 3rd parties (e.g., enterprises) that require similar network functionalities, which should be supported in an efficient manner.

The huge amount of mobile data traffic has occurred in a mobile communication network due to the development of smart phones and fast market penetration, and communication traffic types from the legacy peer-to-peer communication to communication for freely exchanging signals between applications have been changed remarkably. In a mobile communication system of high speed and high capacity, traffic congestion control is important in maintaining service stability in various statuses. Also, mobile data traffic may be increased to an unexpected level and a network may be operated in error during occurrence of major disaster such as big earthquake. Therefore, a mobile communication system needs a mechanism for preventing unexpected high traffic from occurring before the unexpected high traffic occurs. To make sure of emergency call and/or successful communication for a disaster board, a traffic congestion control mechanism should reduce calls which are not important/has a low priority to make sure of network resources for call important/having a high priority and emergency call to be available for many users if possible. In the 3GPP, a series of traffic congestion mechanisms have been standardized to control mobile communication access for a network. An access control mechanism standardized as a part of 3G (UMTS) specifications and widely used in the LTE is also called "access class (AC)" which is a control technology that uses priority identifier data stored in a UE. Hereinafter, the legacy access control mechanism will be described in more detail.

Under certain circumstances, it will be desirable to prevent UE users from making access attempts (including emergency call attempts) or responding to pages in specified areas of a PLMN. Such situations may arise during states of emergency, or where 1 of 2 or more co-located PLMNs has failed. Broadcast messages should be available on a cell by cell basis indicating the class(es) or categories of subscribers barred from network access. The use of these facilities allows the network operator to prevent overload of the access channel under critical conditions. It is not intended that access control be used under normal operating conditions. It should be possible to differentiate access control between CS and PS domains. Details on access control are specified in 3GPP TS 23.122 and 3GPP TS 25.304Not all RATs need to support this functionality.

All UEs are members of one out of ten randomly allocated mobile populations, defined as Access Classes 0 to 9. The population number is stored in the SIM/USIM. In addition, UEs may be members of one or more out of 5 special categories (Access Classes 11 to 15), also held in the SIM/USIM. These are allocated to specific high priority users as follows. (The enumeration is not meant as a priority sequence):

Access Class 15: PLMN Staff;
Access Class 14: Emergency Services;
Access Class 13: Public Utilities (e.g., water/gas suppliers);
Access Class 12: Security Services;
Access Class 11: For PLMN Use.

Access control used in the current LTE/EPS system is based on access class barring (ACB) which is based on an access control method used in UMTS and GSM system corresponding to previous systems of the LTE/EPS. Afterwards, in accordance with standardization, in addition to ACB, additional mechanisms, for example, service specific access control, access control for CSFB, extended access barring, application specific access control, emergency calls, prevention of mobile originating signaling and/or data traffic, etc. have been added as access control mechanisms used in the current LTE/EPS system. Hereinafter, the access control mechanisms used in the legacy LTE/EPS system will be described.

Access Class Barring (ACB)

If the UE is a member of at least one Access Class which corresponds to the permitted classes as signalled over the air interface, and the Access Class is applicable in the serving network, access attempts are allowed. Additionally, in the case of the access network being UTRAN the serving network can indicate that UEs are allowed to respond to paging and perform location registration (see, sec 3.1), even if their access class is not permitted. Otherwise access attempts are not allowed. Also, the serving network can indicate that UEs are restricted to perform location registration, although common access is permitted. If the UE responded to paging it shall follow the normal defined procedures and react as specified to any network command. The network operator can take the network load into account when allowing UEs access to the network. Access Classes are applicable as follows:

Access Classes 0~9: Home and Visited PLMNs;
Access Classes 11 and 15: Home PLMN only if the equivalent Home PLMN (EHPLMN) list is not present or any EHPLMN;
Access Classes 12, 13, 14: Home PLMN (HPLMN) and visited PLMNs (VPLMNs) of home country only. For this purpose the home country is defined as the country of the mobile country code (MCC) part of the IMSI.

Any number of these classes may be barred at any one time. In the case of multiple core networks sharing the same access network, the access network shall be able to apply Access Class Barring for the different core networks individually. The following is the requirements for enhanced Access control on E-UTRAN.

The serving network shall be able to broadcast mean durations of access control and barring rates (e.g. percentage value) that commonly applied to Access Classes 0-9 to the UE. The same principle as in UMTS is applied for Access Classes 11-15.
E-UTRAN shall be able to support access control based on the type of access attempt (i.e. mobile originating data or mobile originating signaling), in which indications to the UEs are broadcasted to guide the behaviour of UE. E-UTRAN shall be able to form combinations of access control based on the type of access attempt e.g. mobile originating and mobile terminating, mobile originating, or location registration. The 'mean duration of access control' and the barring rate are broadcasted for each type of access attempt (i.e. mobile originating data or mobile originating signaling).
The UE determines the barring status with the information provided from the serving network, and perform the access attempt accordingly. The UE draws a uniform random number between 0 and 1 when initiating connection establishment and compares with the current barring rate to determine whether it is barred or not. When the uniform random number is less than the current barring rate and the type of access attempt is indicated allowed, then the access attempt is allowed; otherwise, the access attempt is not allowed. If the access attempt is not allowed, further access attempts of the same type are then barred for a time period that is calculated based on the 'mean duration of access control' provided by the network and the random number drawn by the UE.
The serving network shall be able to indicate whether or not a UE shall apply Access Class Barring for SMS access attempts in SMS over SGs, SMS over IMS (SMS over IP), and SMS over S102. This indication is valid for Access Classes 0-9 and 11-15.
The serving network shall be able to indicate whether or not a UE shall apply Access Class Barring for MMTEL voice access attempts. This indication is valid for Access Classes 0-9 and 11-15.
The serving network shall be able to indicate whether or not a UE shall apply Access Class Barring for MMTEL video access attempts. This indication is valid for Access Classes 0-9 and 11-15.

Service Specific Access Control (SSAC)

Additionally to the requirements described in ACB, in E-UTRAN it shall be possible to support a capability called SSAC to apply independent access control for telephony services (MMTEL) for mobile originating session requests from idle-mode and connected-mode as following.

The serving network shall be able to indicate (as specified in the above ACB) whether or not a UE subject to SSAC shall also apply Access Class Barring.
EPS shall provide a capability to assign a service probability factor and mean duration of access control for each of MMTEL voice and MMTEL video:
assign a barring rate (percentage) commonly applicable for Access Classes 0-9.
assign a flag barring status (barred/unbarred) for each Access Class in the range 11-15.
SSAC shall not apply to Access Class 10.
SSAC can be provided by the VPLMN based on operator policy without accessing the HPLMN.
SSAC shall provide mechanisms to minimize service availability degradation (i.e. radio resource shortage) due to the mass simultaneous mobile originating session requests and maximize the availability of the wireless access resources for non-barred services.
The serving network shall be able to broadcast mean durations of access control, barring rates for Access Classes 0-9, barring status for Access class in the range 11-15 to the UE.
The UE determines the barring status with the information provided from the serving network, and perform the access attempt accordingly. The UE draws a uniform random number between 0 and 1 when initiating connection establishment and compares with the current barring rate to determine whether it is barred or not. When the uniform random number is less than the current barring rate and the type of access attempt is indicated allowed, then the access attempt is allowed; otherwise, the access attempt is not allowed. If the access attempt is not allowed, further access attempts of the same type are then barred for a time period that is calculated based on the 'mean duration of access control' provided by the network and the random number drawn by the UE.

Access Control for CSFB

Access control for circuit switched fallback (CSFB) provides a mechanism to prohibit UEs to access E-UTRAN to perform CSFB. It minimizes service availability degradation (i.e. radio resource shortage, congestion of fallback network) caused by mass simultaneous mobile originating requests for CSFB and increases the availability of the E-UTRAN resources for UEs accessing other services. When an operator determines that it is appropriate to apply access control for CSFB, the network may broadcast necessary information to provide access control for CSFB for each class to UEs in a specific area. The network shall be able to separately apply access control for CSFB, SSAC and enhanced Access control on E-UTRAN.

The following requirements apply for CSFB to 1×RTT: In E-UTRAN, the network may apply access control for mobile originating session requests on CSFB from 1×RTT/E-UTRAN UE, The parameters received by the UE are dealt with in accordance with CDMA2000 procedures in 3GPP2 C.S0004-A: "Signaling Link Access Control (LAC) Standard for cdma2000 Spread Spectrum Systems—Addendum 2".

For CSFB to UTRAN or GERAN, the necessary information in the broadcast to provide access control for CSFB is the same as that specified in the description of ACB. In addition to those requirements the following apply:

Access control for CSFB shall apply for Access Class 0-9 and Access Class 11-15. It shall not apply for Access Class 10.

Access control for CSFB shall be applied for idle mode UE.

Access control for CSFB shall apply to all CSFB services.

Access control for CSFB may be provided by the VPLMN based on operator policy without accessing the HPLMN.

If Access control for CSFB, according to the UE's access class, disallows originating session requests for CSFB then a UE shall not send mobile originating session requests for CSFB.

If Access control for CSFB is applied by the UE for a mobile originating session request for CSFB, the UE shall bypass enhanced Access control on E-UTRAN for that session.

The criteria on which a UE determines whether Access control for CSFB allows or disallows originating session requests for CSFB are equivalent to those for enhanced Access control on E-UTRAN, as described in the ACB.

If access is not granted for the UE, mobile originating session requests for CSFB shall be restricted for a certain period of time to avoid overload of E-UTRAN due to continuous mobile originating session requests from the same UE. The duration of the period shall be determined using the same operation specified in the ACB.

In case the network does not provide the Access control for CSFB information, the UE shall be subject to access class barring for Access Classes 0-9 and 11-15 as described in the ACB.

Extended Access Barring (EAB)

EAB is a mechanism for the operator(s) to control Mobile Originating access attempts from UEs that are configured for EAB in order to prevent overload of the access network and/or the core network. In congestion situations, the operator can restrict access from UEs configured for EAB while permitting access from other UEs. UEs configured for EAB are considered more tolerant to access restrictions than other UEs. When an operator determines that it is appropriate to apply EAB, the network broadcasts necessary information to provide EAB control for UEs in a specific area. The following requirements apply for EAB:

The UE is configured for EAB by the HPLMN.

EAB shall be applicable to all 3GPP Radio Access Technologies.

EAB shall be applicable regardless of whether the UE is in a Home or a Visited PLMN.

A network may broadcast EAB information.

EAB information shall define whether EAB applies to UEs within one of the following categories: UEs that are configured for EAB; b) UEs that are configured for EAB and are neither in their HPLMN nor in a PLMN that is equivalent to it; c) UEs that are configured for EAB and are neither in the PLMN listed as most preferred PLMN of the country where the UE is roaming in the operator-defined PLMN selector list on the SIM/USIM, nor in their HPLMN nor in a PLMN that is equivalent to their HPLMN.

EAB information shall also include extended barring information for Access Classes 0-9.

A UE configured for EAB shall use its allocated Access Class(es), when evaluating the EAB information that is broadcast by the network, in order to determine if its access to the network is barred.

If a UE that is configured for EAB initiates an emergency call or is a member of an Access Class in the range 11-15 and according to the ACB that Access Class is permitted by the network, then the UE shall ignore any EAB information that is broadcast by the network.

If the network is not broadcasting the EAB information, the UE shall be subject to access barring as described in the ACB.

If the EAB information that is broadcast by the network does not bar the UE, the UE shall be subject to access barring as described in the ACB.

In the case of multiple core networks sharing the same access network, the access network shall be able to apply the EAB for the different core networks individually.

Overriding EAB is a mechanism for the operator to allow UEs that are configured for EAB to access the network under EAB conditions. The following requirements apply.

The UE configured with EAB may be configured by the HPLMN with a permission to override EAB.

For a UE configured with the permission to override EAB, the user or application (upper layers in UE) may request the UE to activate PDN connection(s) for which EAB does not apply.

The UE shall override any EAB restriction information that is broadcast by the network as long as it has an active PDN connection for which EAB does not apply.

Application specific Congestion control for Data Communication (ACDC)

ACDC is an access control mechanism for the operator to allow/prevent new access attempts from particular, operator-identified applications in the UE in idle mode. ACDC does not apply to UEs in connected mode. The network can prevent/mitigate overload of the access network and/or the core network. This feature is optional. The following requirements apply.

This feature shall be applicable to UTRAN PS Domain and E-UTRAN.

This feature shall be applicable to UEs in idle mode only that are not a member of one or more of Access Classes 11 to 15.

ACDC shall not apply to MMTEL voice, MMTEL video and SMS over IMS (SMS over IP) services.

The home network shall be able to configure a UE with at least four and a maximum of sixteen ACDC categories to each of which particular, operator-identified applications are associated. The categories shall be ordered as specified.

The serving network shall be able to broadcast, in one or more areas of the RAN, control information, indicating barring information per each ACDC category, and whether a roaming UE shall be subject to ACDC control. The barring information may be similar to ACB information, and include mean durations of access control (i.e., barring timer) and barring rates (i.e., percentage value). If the barring timer is running due to a previous access attempt from an application in a certain given matched ACDC category, the UE may only allow access attempts from applications in higher ACDC categories (according to the corresponding barring information for those higher categories). If the barring timer is running due to a previous access attempt from an application in a certain given unmatched ACDC category or a uncategorised application, the UE may only allow access attempts from applications in higher ACDC categories than the lowest ACDC category broadcast (according to the corresponding barring information for those higher categories).

The UE shall be able to control whether or not an access attempt for a certain application is allowed, based on this broadcast barring information and the configuration of ACDC categories in the UE.

The serving network shall be able to simultaneously indicate ACDC with other forms of access control.
 When both ACDC and ACB controls are indicated, ACDC shall override ACB.
 If a UE is configured for both EAB and ACDC, and the serving network simultaneously broadcasts EAB information and ACDC barring information:
  If the UE determines as specified in the EAB that access to the network is not barred or as specified in overriding EAB that it is permitted to override an EAB restriction, then access to the network is subject to ACDC.
  If the UE determines as specified in the EAB that access to the network is barred and as specified in overriding EAB that it is not permitted to override the EAB restriction, then access to the network is barred.

In the case of multiple core networks sharing the same access network, the access network shall be able to apply ACDC for the different core networks individually. For the mitigation of congestion in a shared RAN, barring rates should be set equal for all Participating Operators.

When configuring the UE with categories of applications, the home network shall proceed as follows:
 Applications whose use is expected to be restricted the least shall be assigned the highest ACDC category; and
 Applications whose use is expected to be restricted more than applications in the highest category shall be assigned the second-to-highest ACDC category, and so on; and
 Applications whose use is expected to be restricted the most shall either be assigned the lowest ACDC category, or not be categorised at all.

For a UE with ACDC categories configured, the applications on the UE that are not assigned to any ACDC category shall be treated by the UE as part of the lowest ACDC category broadcast by the serving network. If the operator requires differentiation with respect to these uncategorized applications, the operator should avoid assigning applications to the lowest ACDC category. When applying ACDC, the serving network broadcasts barring information starting from the highest to the lowest ACDC category. The home network and the serving network may use different categorisation. The serving network decides if ACDC applies to roaming UEs.

The number of ACDC categories in the UE may not be the same as the number of ACDC categories broadcast by the serving network. This may happen, e.g. when the UE is roaming and the number of categories broadcast by the serving network is different from the home network. Therefore the following rules shall apply:
 If the serving network broadcasts more ACDC categories than the UE's configuration, the UE shall use barring information for the matching ACDC category, and shall bar uncategorised applications using the barring information for the lowest category broadcast by the serving network, and shall ignore barring information for unmatched categories.
 If the serving network broadcasts barring information for fewer ACDC categories than the UE's configuration, the UE shall use barring information for the matching ACDC category and shall bar other applications using the barring information for the lowest category broadcast by the serving network. A matching ACDC category is an ACDC category for which barring information is broadcast by the serving network and that has the same rank as the rank of a configured ACDC category in the UE. An unmatched ACDC category is either an ACDC category for which barring information is broadcast by the serving network but with no corresponding ACDC category configured in the UE, or an ACDC category configured in the UE but with no corresponding barring information broadcast by the serving network.

Emergency Calls

An additional control bit known as "Access Class 10" is also signaled over the air interface to the UE. This indicates whether or not network access for Emergency Calls is allowed for UEs with access classes 0 to 9 or without an IMSI. For UEs with access classes 11 to 15, Emergency Calls are not allowed if both "Access class 10" and the relevant Access Class (11 to 15) are barred. Otherwise, Emergency Calls are allowed.

Multimedia Priority Service

Multimedia Priority Service (see 3GPP TS 22.153) shall be assigned its own unique access class value (i.e., one of the special access classes 11 to 15). The assigned access class value for Multimedia Priority Service is based on regional/national regulatory requirements and operator policy.

Control of UE Capabilities

To protect the user from the effects of a misbehaving UE (e.g. causing additional charges, degraded performance) and to protect the network operator's network capacity, including radio resources and network signaling and processing, means shall be provided for the HPLMN/EHPLMN and the VPLMN to provide an indication to the UE as to which network provided services or functions it is not allowed to use. The Selective UE Capabilities list, shall be maintained in the UE and the UE shall not request any services indicated as disabled. At registration the HPLMN/EHPLMN or VPLMN may interrogate the status of the list and provide a new list. The Selective UE Capabilities list shall not be deleted at switch off and will remain valid until a new list is provided by the network. The Selective UE Capabilities list relates to the ME and not to the subscription. It should be ensured that UEs are not maliciously disabled, including malicious disabling by a VPLMN, or accidentally disabled, or kept disabled, and there shall be a mechanism for restoring disabled UEs in all situations (e.g. in the case that the serving network does not support the control of UE Capabilities). The UE should use the indications given in the Selective UE Capabilities list to inform the user of the non-availability of services or functions. There shall be a means for the network to provide an optional customer service number(s) which can be used, by the user, to assist in determining the cause of non-availability of specific services. The specifications should also provide the capability for the network to include an optional text string that will be displayed by the UE. The UE Capabilities list shall take precedence over subscribed services. The services to be included in the list are:
 Call Control functions;
 Supplementary Services;
 Emergency Calls (including the (U)SIM-less case and subject to regional regulatory requirements, i.e. emergency calls shall not be disabled in regions where support of them is required);
SMS, via CS and PS;
LCS, via CS and PS;
GPRS based services;
MBMS;
IMS.

Prevention of Mobile-Originating Signaling and/or Data Traffic

The network is able to control the behavior of UEs in E-UTRAN in connected mode to prevent mobile originating signaling and/or data traffic, while the access barring mechanisms specified under Clause 4.3 are being applied to UEs in idle mode.

As described above, access control mechanisms used in the current LTE/EPS system include service specific access control (SSAC), access control for CSFB, extended access barring (EAB), application specific access control (ASAC), emergency calls, prevention of mobile originating signaling and/or data traffic, etc., which are added to ACB based on UMTS and GSM system which are previous systems of the LTE/EPS. These mechanisms are additionally applied to access control based on access class, wherein a UE identifies an access control mechanism to be performed by itself among the access control mechanisms if data to be transmitted occur, checks whether the UE may attempt an access to a network, if the access attempt is permitted as a result of checking, additionally checks access class barring, and then transmits RRC connection request to a base station to perform the access attempt if the access class barring check passes finally.

In the GSM/UMTS, each UE identifies its access class on the basis of access class information stored in SIM card and performs access based on the identified result. For example, if access class is designated as 1 in SIM of the UE and a base station/network notifies that access is permitted for only access classes 5 and 9, the UE cannot perform access to the base station/network. On the other hand, if the base station/network notifies that access is also permitted for access class 1, the UE may perform access to the base station/network.

However, the access control mechanism used in the GSM/UMTS has a big defect. This defect occurs when a congestion status occurs in the base station. Operators may issue SIM cards to allow the access classes to be uniformly distributed. For example, if a random operator issues 1000000 SIM cards, 100000 SIM cards per each of access classes 0 to 9 will uniformly be distributed. In this case, if a random base station permits access for only one access class at a certain time interval from 0 to 9 to solve a congestion status, system information transmitted from the base station to each UE should be updated at least 10 times to indicate access class permission information consistently updated. This means that system information update procedures of maximum 10 times are performed to allow a random UE to actually access a network. This causes power consumption of the UE and increases complexity of the base station.

To solve this problem, the LTE system regards the access classes 0 to 9 as the same pool without respectively controlling the access classes 0 to 9, and applies a probability value (that is, barring rate) and a standby or back-off time (that is, average duration of access control) value. That is, unlike the GSM/UMTS that uses only one access class set to SIM card of the UE, each UE of the LTE system selects a random one of values from 0 to 1, if it desires to access the base station, regardless of its access class, and performs access (attempt) if the value is greater than the probability value provided by the network and does not perform access (attempt) if not so. Through this method, each UE has reduced load of system information update management. However, this method has a problem in that the same access control is applied to even a case that a difference between UEs is required. For example, there may be an operator who desires to differentiate specific users, for example, a user who pays a large fee from a user who pays a small fee, through access class identification. That is, an operator may want to allocate access class 0 to a user who pays the largest fee, and allocate access class 9 to a user who pays the smallest fee is allocated to access class 9. In this case, the fairest access control is to provide more access opportunities to access class 0 than access class 9. For example, access class 0 provides a high probability value. However, the access control mechanism introduced in the LTE/EPS restricts flexibility of the operator, whereby a problem occurs in that respective QoSs different from each other are not provided to UEs.

To solve this problem, a dynamic access class allocation mechanism may be used. The dynamic access allocation mechanism allows each UE to receive its access class during registration in a network and makes each UE use the allocated access class during access procedure. Hereinafter, access class allocated to UE by the dynamic access class allocation mechanism will be referred to as "access category" to be differentiated from the legacy access class. The network may dynamically deliver available access category information to each UE based on various kinds of information such as characteristics of applications used by each UE, subscriber information of each UE, and UE capability of each user. Based on this, when each UE desires to actually perform an access to a network, each UE may determine an access category suitable for the access, perform access check suitable for the corresponding access category, and thus determine whether to actually perform transmission for access to eNB.

Figure 10:
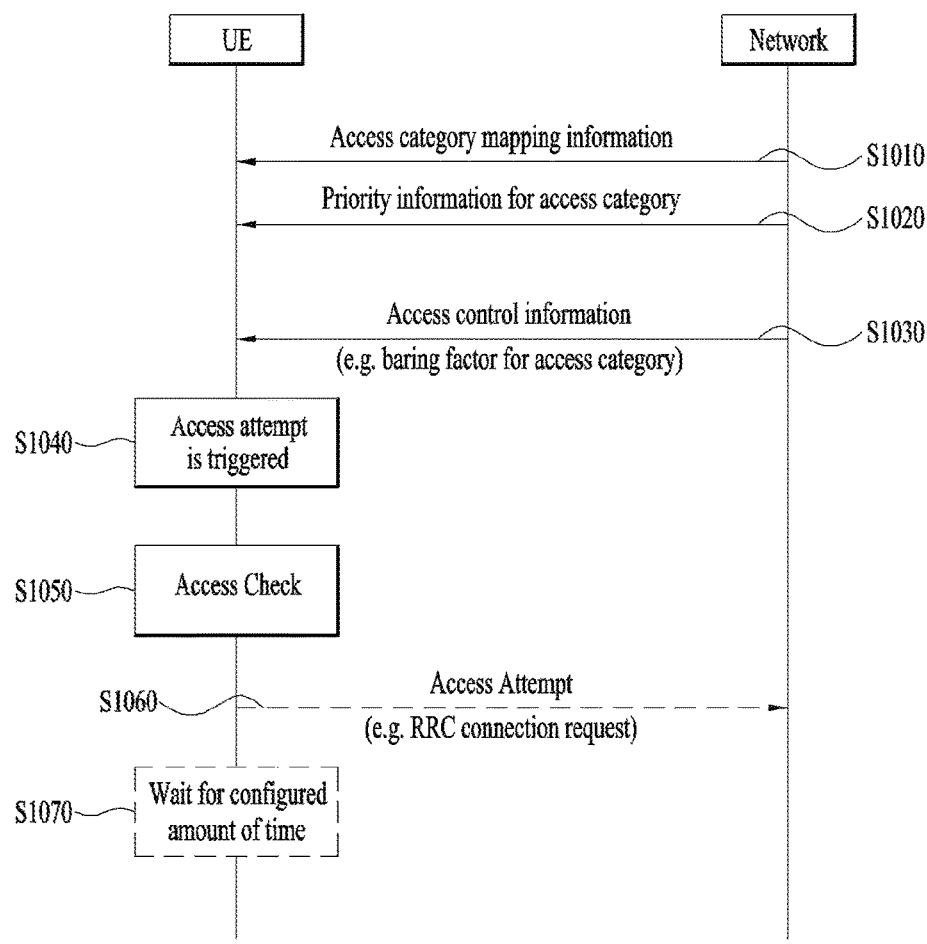
FIG. 10 is a diagram illustrating a procedure of attempting an access to a network according to the present invention.

FIG. 10 is a diagram illustrating a procedure of attempting an access to a network according to the present invention.

When a method for dynamically allocating access category to each UE is used, the network should notify UEs to which access category a corresponding access attempt belongs (S1010). For example, for UE A, the network may configure mobile originating data access as access category 3 and configure mobile terminating data access as access category 5. Based on system information (e.g., system information block (SIB)) on a cell, a BS may notify the UE whether access has been permitted for each access category, and notify the UE of information on probability available for the access if the access is permitted for each access category (S1030). For example, the BS may transmit system information indicating that access categories 1, 2, 3 and 4 have been permitted and access categories 5, 6, 7 and 8 have been prohibited, on the cell. If data are generated by the UE A, the UE A may determine that an access for transmitting the data corresponds to access category 3, the UE A attempts the access since the access corresponding to access category 3 is permitted by the cell in view of the system information. If the UE A performs the access by receiving paging, the access triggered by paging corresponds to access category 5, and the UE A does not attempt the access because the access category 5 is prohibited in the cell.

As described above, in the method for dynamically allocating and using access categories, the network should deliver criterion information on each access category to the UE. That is, when the UE is to attempt a random access, the UE should know information on access category to which the access is allocated, thereby determining access category to be used by itself. However, criterion information on access category set to each UE cannot express all kinds of combinations. The more detailed criterion information means that the amount of information transmitted from the network to the UE is increased. This affects substantial data transmission capacity of the system. Therefore, each criterion information is roughly or coarsely expressed. If different criteria are not mutually exclusive, a plurality of different access category criteria may simultaneously be applied to the same access attempt. In this case, different UEs may be operated differently from each other. That is, in respect of access control for the same access attempt, a UE may use a parameter having high access opportunity (small access barring), and another UE may use a parameter having low access opportunity (large access barring). In this case, different QoSs may be applied to UEs to which the same QoS should be applied, or a user uses a specific application, whereas another user cannot use the application, whereby this could lead to consumer's complaints.

Therefore, the present invention suggests a method for providing fair access opportunities to UEs through minimum system load while providing different access opportunities to the UEs in accordance with types and services of the UEs. Particularly, the present invention suggests a method for performing a radio access control by allowing a network to designate priories between a plurality of access groups/categories, which may be used by a UE, in a mobile communication system that manages an access of UE(s) to a system by variably managing an access class to which each UE belongs. The UE may determine whether to perform an access to the system by applying an access category in accordance with the priority.

The present invention suggests to deliver an access category, which may be used by a corresponding UE, and a criterion for the access category to the UE, during configuring access category(es) dynamically each UE in a next generation mobile communication system (S1010) and notify each UE of priority information on an access category which should first be applied by the UE (S1020).

The priority information on access category which should first be applied means information on priority per access category. For example, if a UE should attempt a new access, the UE checks an access category mapped into the access. At this time, if a plurality of access categories are satisfied for a criterion, the priority information is information as to which one of the plurality of access categories should first be applied. For example, it is assumed that access category information is configured to UE A as follows.

Category 1: mobile originating data,
Category 2: mobile terminating data,
Category 3: mobile originating signalling,
Category 4: data of application A, B, C,
Category 5: data of application D, E, F,
Category 6: data of applications using IMS function,
Category 10: target or source IP is google.com,
Category 11: used protocol is TCP.

Additionally, it is assumed that application A interworks with VoLTE call, that is, performs IMS function. At this time, if data are generated from application A of the UE (S1040), a processor of the UE A may determine that conditions of Category 1, Category 4 and Category 6 are all satisfied. At this time, if priority information is configured to the UE A in accordance with the present invention, the UE A may determine whether to apply which category when performing access check. For example, the following information may be provided additionally in accordance with the present invention.

Category 1: mobile originating data: Priority 2,
Category 2: mobile terminating data: Priority 3,
Category 3: mobile originating signaling: Priority 1,
Category 4: data of application A, B, C: Priority 4,
Category 5: data of application D, E, F: Priority 5,
Category 6: data of applications using IMS function: Priority 6,
Category 10: target or source IP is google.com: priority 7,
Category 11: used protocol is TCP: priority 8.

Since priority of Category 1 is 2, priority of Category 4 is 4 and priority of Category 6 is 5, the UE A first attempts application of Category 1. If there is no access control information corresponding to Category 1, the UE A applies the highest priority among the other matched categories having access control information.

In other words, the UE checks an access category with which an access attempt is matched if the access attempt is to occur, that is, a status that the access attempt should be performed occurs (S1040) (hereinafter, the status is referred to as the status that access attempt is triggered). At this time, if the access attempt is matched with a plurality of access categories, the UE checks SIB information transmitted from a cell to which the UE is currently connected or on which the UE is camping, and identifies whether there is access category having access control information. The UE performs access check by using access control information of access category matched with the access attempt, having access control information (S1050). For example, if only access control information on category 4 is provided from the cell through SIB, the UE checks access by using access control information corresponding to category 4.

In this case, the access control information is information for controlling transmission of the access attempt to eNB. For example, the access control information includes barring factor and barring period information. In this case, the UE compares a random number randomly generated by itself with the received barring factor and attempts RACH procedure if the barring number is greater than the barring factor (S1060). If the access check (or access control check) is failed, the UE does not perform access attempt for a certain time period (corresponding to the barring period information) (S1070).

Meanwhile, another UE (hereinafter, UE B) located in the same cell as that of the UE A may receive the following access category configuration information (access category mapping information) through the network and use the same.

Category 2: mobile originating data: Priority 3,
Category 3: mobile originating signaling: Priority 1,
Category 4: data of application A, B, C, D: Priority 2.

If data are generated from application C of the UE B, the data correspond to Category 2 and Category 4. If access control information on Categories 4, 5 and 6 is transmitted from the cell, since access control information available in the cell is only access control information on Category 4 matched with access attempt caused by data generated from the application C, the UE B controls access to the cell by using the access control information on access category 4.

Different access categories may be designated for different UEs even in case of the same application. For example, in the above example, application D corresponds to Category 5 in case of the UE A, and application D corresponds to Category 4 in case of the UE B.

Different access attempts may be allocated to different UEs even in case of the same access category number. For example, in the above example, mobile terminating data are allocated to Category 1 in case of the UE A, and originating data are allocated to Category 2 in case of the UE B.

As shown in the above example, different priorities of the same application group may be allocated to different UEs.

If it is not required that different configuration information should be delivered to each UE, for example, to avoid increase of signaling generated by delivering different configuration information to UEs, the network may deliver configuration information through system information (e.g., SIB) of each cell. That is, the network may notify information as to access categories into which access attempts are mapped, through SIB. In this case, the SIB may include details for describing access attempts corresponding to each access category and related access control information and priority information on each access category just in case that an access attempt is simultaneously mapped into a plurality of access categories. If there are a plurality of access categories matched with an access attempt or if there are a plurality of access categories having access control information, the UE may determine whether to perform its actual access (e.g., RACH procedure or RRC connection establishment procedure) by applying access control information, which is matched with the access attempt and has the highest priority, by using priority information designated for each access category.

Mapping information on access category may be provided through SIB, and priority information may be provided UE-specifically. That is, access category may be commonly configured for a cell but priority may be set UE-specifically.

Meanwhile, in the above example, Category 1 is similar to Category 4/5 but is configured separately from Category 4/5. This is because that an eNB may manage Categories 1/2/3 only whereas another eNB may manage all of Categories 1/2/3/4/5/6/7 due to a difference in update states of each system or a difference in performance of back bone networks to which the eNBs are connected respectively. In some case, a UE may support identification of Categories 1/2 only or another UE may support identification of Categories 1/2/3/4. In this way, since combination of different UEs and different eNBs is available, the network may configure Category information for the UE considering all possible situations when configuring a UE with Category information. Therefore, both information of Category 1 and information of Category 4 may be delivered to UE(s0.

The present invention will be described in more detail in view of 5G system, that is, NextGen system. In comparison with EPS conventionally referred to as 4G system, network slicing is suggested as the most different function in the 5G system. Network slicing may provide a logical network by virtualizing a physical network which is actually installed, whereby different services may be provided to each logical network or a new business model may be supported. In this case, division of radio resources of an actual physical network may be referred to as network slicing, and the divided logical network may be referred to as a network slice.

Network operators may divide different users into different groups through the logical network, and may provide a different service to each user group. For example, IoT UEs may be grouped into one group, wherein a service may be provided to the UEs by using a network slice optimized for IoT, whereas a network slice optimized for a mobile broadband may be allocated to UEs such as general smart phones. For another example, various applications may be installed in a smart phone, wherein the applications installed in the smart phone may be divided into applications that uses real-time communication such as voice/video communication and applications based on simple information display/inquiry/browsing (for example, inquiry of flight schedule and inquiry of restaurants). In this case, the applications related to real-time communication may be configured to use a network slice configured to reduce delivery delay as much as possible, whereas the applications related to simple information service may be configured to use a network slice configured to support reliability of information as much as possible although degree of reducing delivery delay is weak. Therefore, the network slice may be provided to be suitable for properties of different UEs and different applications.

ACDC of the related art is able to identify categories based on applications, whereas access categories used in the present invention may be identified by other factors in addition to the applications. For example, if a network operator needs to control access from various UEs/applications due to congestion occurred in the network, particularly, if differentiating these UEs/applications is implemented through network slicing, access control should be supported, and access categories may be used for support of the access control. For example, the access categories may be configured as follows.

Category 1: mobile originating data,
Category 2: mobile terminating data,
Category 3: mobile originating signaling,
Category 4: data of application A, B, C,
Category 5: data of application D, E, F,
Category 6: data of applications using IMS function,
Category 7: access for Network slice A,
Category 8: access for network slice B,
Category 10: target or source IP is google.com,
Category 11: used protocol is TCP.

ACDC of actual EPS/4G supports only application based differentiation within the UE like Categories 4/5. On the other hand, categories according to the present invention are differentiated based on the other factors as well as application and as well as data/signaling starting from the UE. For example, the network may define access category according to network slice like Categories 7/8. In the above example, if application A is configured to use network slice A and as suggested in the present invention, priority information on Category 4 and Category 7 is provided, the UE may determine whether to use a barring parameter related to Category 4 or a barring parameter related to Category 7.

In the present invention, access of the UE means that the UE transmits something to the network. In this case, transmission of something may mean a unit of information understood by a user or application of actual UE, and may also mean signaling for configuration for transmitting the above information. For example, for understanding of "access" of the present invention, more description of the aforementioned example is as follows.

Category 1: mobile originating data. Mobile originating data mean that access attempt to a network occurs due to data generated from the application of the UE. Actually, if data occur in a UE which is in RRC_IDLE/RRC_INACTIVE mode, to deliver the data to a server on Internet, the UE is switched to RRC_CONNECTED mode, whereby a bearer from the UE to a core network boundary should be configured. Therefore, for configuration/activation of the bearer, the UE needs to configure/activate signaling connection with the network. For example, a service request message is delivered to AMF (Access Mobility Function), or RRC Connection Resume message is delivered to gNB. Transmission of this message or signaling to the network may be regarded as access attempt. In case of mobile originating data, data are first generated from an application of UE, whereby a signaling message is generated. On the other hand, in case of mobile originating signaling of Category 3 which will be described later, signaling is not generated due to data generated from an application of UE, and access to a network is required to transmit signal generated in a control plane such as a mobility management (MM) layer and a session management (SM) layer of UE.

Category 2: mobile terminating data. If a UE receives a paging message from a network, the UE recognizes that there are data to be transmitted from the network to the UE. In this case, the UE performs a response to the paging with respect to the network. For this reason, the case that a UE which is in RRC_IDLE or RRC_INACTIVE state attempts access to the network may correspond to access attempt due to mobile terminating data.

Category 3: mobile originating signaling. It means the case that the need to access to a network is generated by the need of signaling in a control plane of a UE regardless of data generated from an application of the UE. For example, access attempt for message transmission such as ATTACH Request, Registration Request and Tracking Area Update, which is attempted for registration in the network after the UE is powered on may correspond to this category.

Category 4: data of application A, B, C. This category may belong to a sub-categorization of the mobile originating data. That is, this is the case that data to be transmitted from an application A, B or C from applications installed in the UE to the network are generated.

Category 5: data of application D, E, F. This category may belong to a sub-categorization of the mobile originating data. That is, this is the case that data to be transmitted from an application D, E or F from applications installed in the UE to the network are generated.

Category 6: data of applications using IMS function. This category may belong to a sub-categorization of the mobile originating data. That is, this is the case that data are generated from an application of the UE and related to IMS.

Category 10: target or source IP is google.com. This category may belong to a sub-categorization of the mobile originating data. That is, this is the case that data are generated from an application of the UE and have an IP packet type. Access attempt corresponding to the case that target IP or source IP of the IP packet is set to a specific value may be mapped into this category.

Category 11: used protocol is TCP. This category may belong to a sub-categorization of the mobile originating data. That is, the case that data are generated from an application of the UE and have an IP packet type may be mapped into this category.

In the present invention, when the UE accesses BS/network to register itself in the BS/network or update its position, the BS/network delivers access category information, which will be used by the UE, to the UE, and the UE uses the above value during access to the BS/network until a new value is provided thereto. For example, the UE registers itself in the network through ATTACH procedure, tracking area update procedure or its equivalent procedure, and the network may determine access class/category to be allocated to the UE by using various kinds of information such as information of a zone where the UE is located, a service subscribed by the UE and network slice information corresponding to the UE, and may notify the UE of the determined access class/category. The network may provide different access opportunities in accordance with types and services of UEs and achieve fair access opportunities through minimum system load by dynamically allocating each access category to the UEs.

Figure 11:
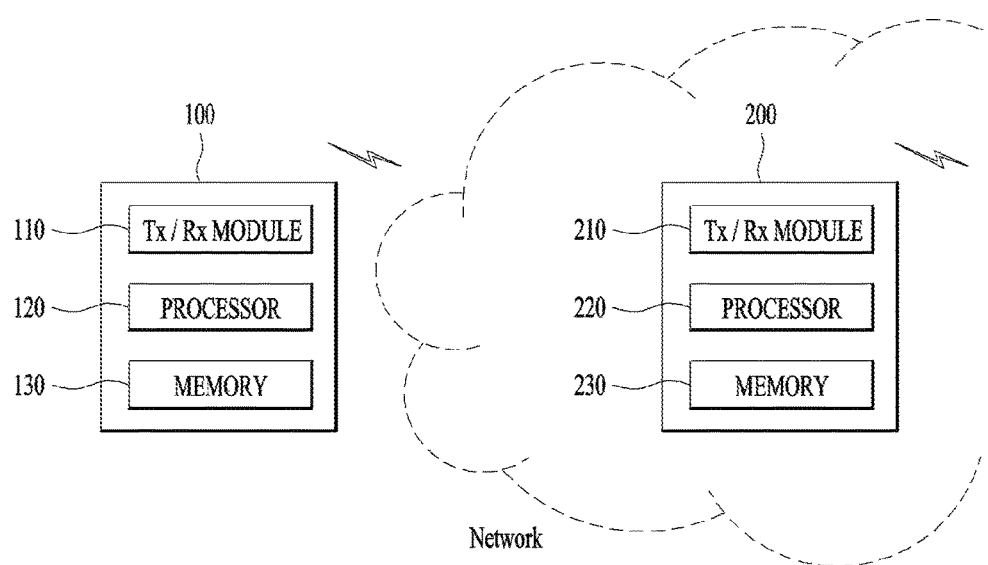
FIG. 11 illustrates a node according to an embodiment of the present invention.

FIG. 11 illustrates configuration of a UE and a network node according to a preferred embodiment of the present invention.

The UE 100 according to the present invention may include a transceiver 110, a processor 120, and a memory 130. The transceiver 110 may be referred to as a radio frequency (RF) unit. The transceiver 110 may be configured to transmit and receive various signals, data and information to and from an external device. The UE 100 may be connected to the storage device by wire and/or wirelessly. The processor 150 may control overall operation of the UE 100, and be configured to calculate and process information for the UE 100 to transmit and receive to and from the external device. In addition, the processor 120 may be configured to perform the proposed operations of the UE. The memory 130 may store the calculated and processed information for a predetermined time, and may be replaced by another constituent such as a buffer (not shown).

Referring to FIG. 11, the network node 200 according to the present invention may include a transceiver 210, a processor 220 and a memory 230. The transceiver 210 may be referred to as an RF unit. The transceiver 210 may be configured to transmit and receive various signals, data and information to and from an external device. The network node 200 may be connected to the storage device by wire and/or wirelessly. The processor 220 may control overall operation of the network node 200, and be configured to calculate and process information for the network node 200 to transmit and receive to and from the external device. In addition, the processor 220 may be configured to perform the proposed operations of the network node. The memory 230 may store the calculated and processed information for a predetermined time, and may be replaced by another constituent such as a buffer (not shown).

For configuration of the UE 100 and the network apparatus, the details described in various embodiments of the present invention may be independently applied or implemented such that two or more embodiments are simultaneously applied. For simplicity, redundant description is omitted.

The embodiments of the present invention may be implemented through various means. For example, the embodiments may be implemented by hardware, firmware, software, or a combination thereof.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present invention may be embodied as an apparatus, a procedure, or a function that performs the functions or operations described above. Software code may be stored in a memory unit and executed by a processor. The memory unit is located at the interior or exterior of the processor and may transmit and receive data to and from the processor via various known means.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

The communication method described above is applicable to various wireless communication systems including IEEE 802.16x and 802.11x systems as well as a 3GPP system. Furthermore, the proposed method is applicable to a millimeter wave (mmWave) communication system using an ultrahigh frequency band.

What is claimed is:

1. A method for performing, by a user equipment (UE), an access attempt to a network in a wireless communication system, the method comprising:
   receiving mapping information on each of a plurality of access categories mapped with the access attempt and priority information on a priority of the each of the plurality of access categories;
   receiving access control information on one or more of the plurality of access categories through system information block (SIB);
   determining whether the access attempt is permitted by applying the access control information of an access category in the order of an access category with a higher priority to an access category with a lower priority based on the priority information among the one or more of the plurality of access categories having the access control information, based on that the access attempt is triggered; and
   performing the access attempt based on that, among the one or more of the plurality of access categories there is an access category for which access is permitted,
   wherein the mapping information and the priority information are UE specific information.

2. The method according to claim 1, wherein the access attempt is not performed based on that, among the plurality of access categories mapped with the access attempt, there is no access category for which access is permitted.

3. The method according to claim 1, wherein, for each of the plurality of access categories, the mapping information indicates a network slice, IP address, signal format or access cause.

4. The method according to claim 1, wherein performing the access attempt includes starting a random access procedure or radio resource control (RRC) connection establishment procedure.

5. A user equipment (UE) for performing an access attempt to a network in a wireless communication system, the UE comprising:
   a radio frequency (RF) unit; and
   a processor configured to control the RF unit, the processor configured to:
   control the RF unit to receive mapping information on each of a plurality of access categories mapped with the access attempt and priority information on a priority of the each of the plurality of access categories,
   control the RF unit to receive access control information on one or more of the plurality of access categories through system information block (SIB),
   determine whether the access attempt is permitted by applying the access control information of an access category in the order of an access category with an higher priority to an access category with a lower priority based on the priority information, among the one or more of the plurality of access categories having the access control information, based on that the access attempt is triggered, and
   control the RF unit to perform the access attempt based on that, among the one or more of the plurality of access categories, there is an access category for which access is mapped,
   wherein the mapping information and the priority information are UE specific information.

6. The UE according to claim 5, wherein the processor is configured not to perform access attempt if, among the access categories into which the access attempt is mapped, there is no access category for which access is mapped.

7. The UE according to claim 5, wherein, for each of the plurality of access categories, the mapping information indicates a network slice, IP address, signal format or access cause.

8. The UE according to claim 5, wherein the processor performs the access attempt by controlling the RF unit to start a random access procedure or radio resource control (RRC) connection establishment procedure.

9. A method for controlling, by a base station, an access attempt of a user equipment (UE) to a network in a wireless communication system, the method comprising:
   transmitting mapping information on each of a plurality of access categories mapped with the access attempt and priority information on a priority of the each of the plurality of access categories;
   transmitting access control information on one or more of the plurality of access categories through system information block (SIB); and
   receiving an access request to the network from the UE,
   wherein the mapping information and the priority information are UE specific information.

10. A base station (BS) for controlling an access attempt of a user equipment (UE) to a network in a wireless communication system, the BS comprising:
   a radio frequency (RF) unit; and
   a processor configured to control the RF unit, the processor configured to:
   control the RF unit to transmit mapping information on each of a plurality of access categories mapped with the access attempt and priority information on a priority of the each of the plurality of access categories,
   control the RF unit to transmit access control information on one or more of the plurality of access categories through system information block (SIB), and
   control the RF unit to receive an access request to the network from the UE,
   wherein the mapping information and the priority information are UE specific information.

* * * * *